(12) United States Patent
Patel et al.

(10) Patent No.: US 8,377,195 B2
(45) Date of Patent: Feb. 19, 2013

(54) EXTREMELY HIGH TEMPERATURE WEARING COMPOUND

(75) Inventors: Prakash S. Patel, Algonquin, IL (US); Shabbir Attarwala, Simsbury, CT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 13/230,037

(22) Filed: Sep. 12, 2011

(65) Prior Publication Data

US 2012/0027935 A1 Feb. 2, 2012

Related U.S. Application Data

(63) Continuation of application No. PCT/US2010/026930, filed on Mar. 11, 2010.

(60) Provisional application No. 61/160,112, filed on Mar. 13, 2009.

(51) Int. Cl.
*G09D 1/00* (2006.01)
(52) U.S. Cl. ...................... 106/638; 106/692; 428/411.1; 427/402; 427/372.2
(58) Field of Classification Search ................... 427/402, 427/372.2; 106/638, 692; 428/411.1
See application file for complete search history.

(56) References Cited

U.S. PATENT DOCUMENTS

| 3,130,061 A * | 4/1964 | McMahon et al. ............ 106/623 |
| 5,234,631 A | 8/1993 | Kokuta et al. |
| 2004/0176529 A1 | 9/2004 | Lawrence et al. |
| 2005/0137291 A1 | 6/2005 | Schneider |
| 2008/0090069 A1 | 4/2008 | Walters et al. |

FOREIGN PATENT DOCUMENTS

| JP | 09-110984 | 4/1997 |
| JP | 00-265116 | 9/2000 |
| WO | WO 2007-076766 | 7/2007 |

OTHER PUBLICATIONS

International Preliminary Report on Patentability for PCT/US2010/026930, Sep. 13, 2011, 5 pages.*
International Search Report issued in connection with International Patent Application No. PCT/US2010/026930 mailed Sep. 29, 2010.

* cited by examiner

*Primary Examiner* — William Phillip Fletcher, III
(74) *Attorney, Agent, or Firm* — Steven C. Bauman

(57) ABSTRACT

A wearing compound slurry comprising an inorganic binder, ceramic particles, ceramic powder, diluent and optionally filler and discontinuous fibers. The slurry is applied to a wearable surface and exposed to heat to remove diluent and cure the wearing compound into a hard layer. The cured wearing compound layer remains intact after exposure to extremely high temperatures.

12 Claims, 2 Drawing Sheets

EXTREMELY HIGH TEMPERATURE WEARING COMPOUND

FIELD

The present disclosure relates generally to wear resistant coatings. It is more particularly concerned with new and improved predominately inorganic coatings resistant to wear at high temperatures.

BACKGROUND

Many pieces of industrial equipment such as pump impellers and bodies, pipe elbows, cyclone and separator bodies, fan blades, fan housings and material handling surfaces are exposed to particulate impact or cavitation during use. Continued particulate impact or cavitation erodes contact parts of the equipment to the point the equipment fails.

Various coating materials have been proposed to prevent such erosion and/or repair already eroded equipment. Some wear coating materials use epoxy resins to bind other coating components to wear prone surfaces. While such materials can be useful in some situations the organic epoxy binder portion is susceptible to thermal degradation at very high temperatures. As the organic binder thermally degrades the remaining coating components are readily eroded from the wear surface which then erodes.

SUMMARY

One aspect of the disclosure provides a wearing compound that will remain adherent to a wear surface and lessen wear surface erosion when exposed to temperatures of about 1,000° F. in an air atmosphere. Another aspect of the disclosure provides a wearing compound predominately comprising inorganic components. One advantageous variation provides a wearing compound comprising more than about 90% by weight inorganic components. Advantageously the wearing compound can be easily applied as a slurry to a wear prone surface and cured by heating to form a predominately inorganic wear layer on that surface.

In general, the disclosed compositions may be alternately formulated to comprise, consist of, or consist essentially of, any appropriate components herein disclosed. The disclosed compositions may additionally, or alternatively, be formulated so as to be devoid, or substantially free, of any components, materials, ingredients, adjuvants or species used in the prior art compositions or that are otherwise not necessary to the achievement of the disclosed function and/or objectives.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

BRIEF DESCRIPTION OF THE DRAWINGS

Referring now to the drawings wherein like elements are numbered alike in the several Figures.

DETAILED DESCRIPTION

Figure 1:
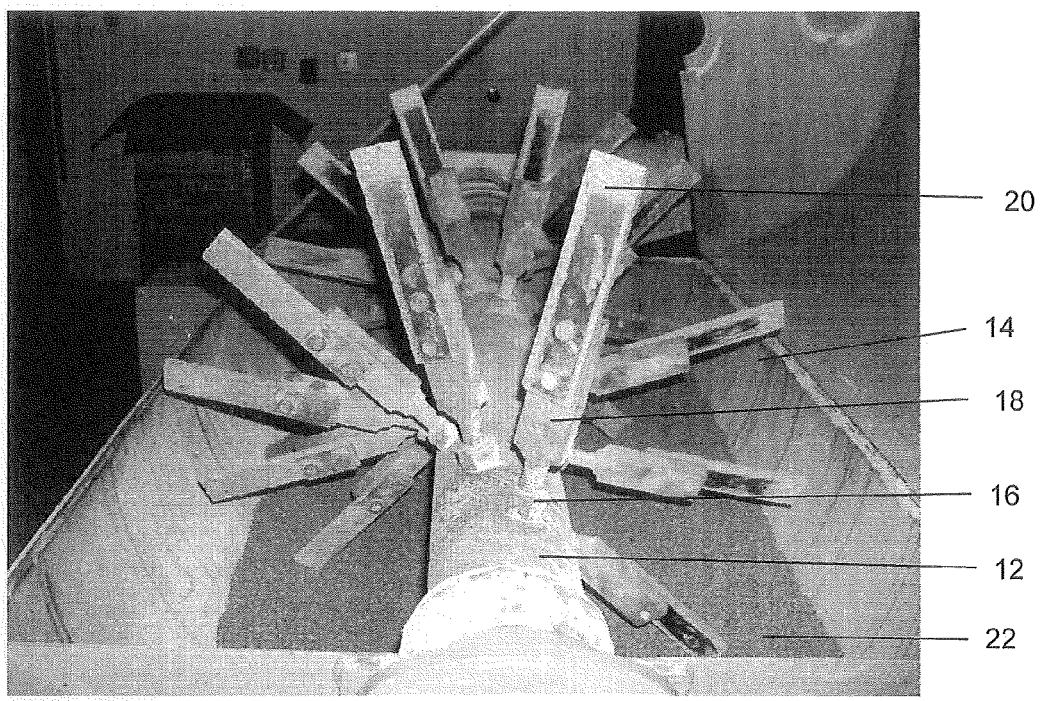
FIG. 1 is an illustration of an abrasion tester with specimens installed.

In one advantageous embodiment the wearing compound is a slurry consisting of an inorganic binder and comprising ceramic particles, filler, fluid diluent and optionally minor amounts of composition additives such as wetting agents and reinforcing fibers. Typically the diluent is water. The wearing compound slurry is applied to a wear surface using any method convenient to the user. The high viscosity of these wearing compound slurries makes application by trowel or spray possible.

The applied wearing compound is cured by exposure to elevated temperatures for a time sufficient to drive off water and form a hard coating over the wear surface. Exposure to about 220° F. to 300° F. for about 2 hours has proven useful to cure the wearing compound.

The wearing compound will include inorganic binder to bind the other components to the wear surface and maintain the bond at very high temperatures, for example about 1,000° F. For example, the wearing compound slurry may include about 10 percent to about 50 percent by weight inorganic binder. Advantageously, the inorganic binder is soluble in water to allow mixing and formation of the aqueous wearing compound. The binder can cure after application of the wearing compound to the wear surface.

As used herein inorganic binder does not contain a carbon atom backbone. Some advantageous inorganic binders include alkaline metal silicates such as potassium silicates and sodium silicates, for example sodium metasilicate. Hydrated versions of the alkaline metal silicates such as hydrated sodium metasilicate are presently preferred because they are available as an aqueous solution that will mix relatively well with other components. Sodium silicate solutions are presently especially preferred as once the binder is cured it is resistant to subsequent dissolution in aqueous fluid streams. After curing the alkaline metal silicate dehydrates to form a high melting point inorganic binder.

The wearing compound will include a substantial amount of ceramic particles to improve resistance of the cured wearing compound coating to erosion. For example, the wearing compound slurry may include about 30 percent to about 70 percent by weight ceramic particles. Many different ceramic materials may be used, for example oxides, carbides, borides, nitrides, silicides and titanates. One advantageous ceramic particle is aluminum oxide.

Ceramic particles can have a shape chosen to permit dense packing in the cured wearing compound coating and a length of about 0.1 mm to about 10 mm. The wearing compound may advantageously include ceramic particles having two or more different sizes. For example, the wear compound slurry can comprise about 10 percent to about 50 weight percent of ceramic particles having an average length of about 0.1 mm to about 6 mm and about 10 percent to about 50 weight percent of ceramic particles having an average length of about 5 mm to about 10 mm. Use of different sized ceramic particles is believed to allow denser packing of the particles in the cured wearing compound coating and thereby increased erosion resistance of the coating.

The wearing compound can include ceramic powder. For example, the wearing compound slurry may include about 10 percent to about 40 percent by weight ceramic powder. A ceramic powder has a length of about 0.1 mm or less and is smaller than a ceramic particle. Many different ceramic powders may be used, for example oxides, carbides, borides, nitrides, silicides and titanates. Combinations of different ceramic powders and sizes may also be useful. One advantageous ceramic powder is aluminum oxide. The ceramic powder is believed to pack between the ceramic particles in the cured wearing compound coating thereby increased erosion resistance of the coating.

The wearing compound may include one or more types of filler to modify viscosity, improve mixability and lessen separation of the wearing compound slurry during storage. For example, the wearing compound slurry may include about 0.1 percent to about 10 percent by weight filler. Filler is typically a very fine powder having a length of about 0.01 mm or less.

Useful fillers may include various platy (flake like) materials; various ground or precipitated chalks; quartz; alumina; non-platy clays; dolomite; talc, glass, microballons, silica; carbon black; metal carbonates such as calcium magnesium carbonate; barite; and silicate-like fillers of the aluminum magnesium calcium silicate type, for example wollastonite and chlorite. The filler can optionally be surface treated, for example, by reaction with a coupling agent such as a silane.

Typically the diluent will be water. However, other fluids in which the wearing compound components can be mixed can also be used.

The wearing compound may optionally include one or more types of composition additives, for example, wetting agents or discontinuous fibers. If present, the composition additives may comprise a relatively small part of the wearing compound slurry, for example less than about 10 percent by weight.

The wearing compound slurry may contain about 0.1 to about 5 percent by weight wetting agent. Useful wetting agent for aqueous slurries include cationic (polyethoxylated tallow amine); propane-1,2,3-trio); nonionic (alkyl polyethylene oxide); fatty alcohols such as cetyl alcohol; polyglycols such as polyethylene glycol. This wetting agent allows easier handling and lessens separation of the mixed wearing compound slurry during storage. Exposure to high temperatures will evaporate or decompose the wetting agent out of the wearing compound coating.

The wearing compound slurry may contain about 0.1 to about 5 percent by weight discontinuous fibers. Discontinuous fibers have a length of about 1.5 mm to about 12.8 mm. Discontinuous fibers include staple fibers, cut fibers and pulp. The discontinuous fibers do not appreciably change handling characteristics of the aqueous slurry. However the discontinuous fibers reinforce the cured wearing compound coating, adding strength and toughness. Useful discontinuous fibers include carbon, ceramic, glass, metal and polyamide such as KEVLAR fiber available from DuPont. Exposure to high temperatures may decompose some carbon based fibers.

The following examples are included for purposes of illustration so that the disclosure may be more readily understood and are in no way intended to limit the scope of the disclosure unless otherwise specifically indicated.

EXAMPLE 1

| ingredient | amount (%) |
|---|---|
| inorganic binder [1] | 20.2 |
| wetting agent [2] | 1.3 |
| ceramic particles [3] | 20.2 |
| ceramic particles [4] | 34.5 |
| discontinuous fiber [5] | .3 |

-continued

| ingredient | amount (%) |
|---|---|
| ceramic powder [6] | 21.1 |
| filler [7] | 2.4 |

[1] aqueous sodium silicate solution
[2] propane-1,2,3-triol
[3] aluminum oxide pellets, 30 mesh; Coors Ceramic
[4] aluminum oxide pellets, 15 mesh; Coors Ceramic
[5] KEVLAR IF 538 from DuPont
[6] aluminum oxide, 325 mesh; Alcoa
[7] magnesium silicate filler, 1200 mesh; MISTRON VAPOR from Luzenac America Liquid wetting agent is added to the aqueous sodium silicate solution and mixed. The discontinuous fiber is added and mixing continued until the fiber is dispersed (about five to ten minutes). The magnesium silicate filler is added and mixing continued for about ten minutes. The ceramic particles and ceramic powder is added and mixing continued for about ten minutes. The final product is a very viscous slurry having the consistency of stiff, wet cement.

High Temperature Resistance Test

A steel plate is coated with a 3 mm film of wearing compound. The film is cured for a time and at a temperature sufficient to cure the film. The steel plate with cured film is placed in an air atmosphere 1,000° F. furnace for 24 hours. After furnace exposure the steel plate is examined for film integrity.

Steel plates were coated with 3 mm films of the EXAMPLE 1 material; NORDBAK wearing compound; NORDBAK high temperature wearing compound and NORDBAK ultra high temperature wearing compound. The NORDBAK compounds are available from Henkel Corporation, Rocky Hill, Conn. The films were cured by heating to 75° F. for about 24 hrs., than to 250° F. for about 2 hours. The steel plates with cured films were exposed to 1,000° F. in an air atmosphere furnace for 24 hours. After furnace exposure the film prepared from EXAMPLE 1 material was substantially intact, adherent to the steel plate and had little visual change. After furnace exposure to 1,000° F. for 24 hours all of the films prepared from the NORDBAK materials had turned to powder and flaked off the steel plates.

Abrasion Resistance Test

With reference to FIG. 1 the abrasion tester comprises an elongated shaft 12 extending over a semi-circular hopper 14. The shaft 12 comprises a plurality of spirally arranged mounting points 16 attached thereto. A specimen holder 18 projects radially from each mounting point 16. The specimen holders 18 are acutely angled with respect to a longitudinal axis defined by the shaft 12 length. Specimen holders 18 proximate to a first side of the hopper 14 are angled with the leading edge of the holder 18 toward the first side of the hopper 14 and specimen holders 18 proximate the second side of the hopper 14 are angled with the leading edge of the holder 18 toward the second side of the hopper 14. Coated specimens 20 can be mounted to the specimen holders 18 and the mounted specimens 20 will also be acutely angled with respect to a longitudinal axis of the shaft 12. Abrasive media 22 is disposed in the hopper 14 so that the coated specimens 20 travel through the media 22 as the shaft 12 rotates. Typically, the coated specimens mounted nearest the hopper sides show more wear than the interior specimens and are not evaluated.

Figure 2:
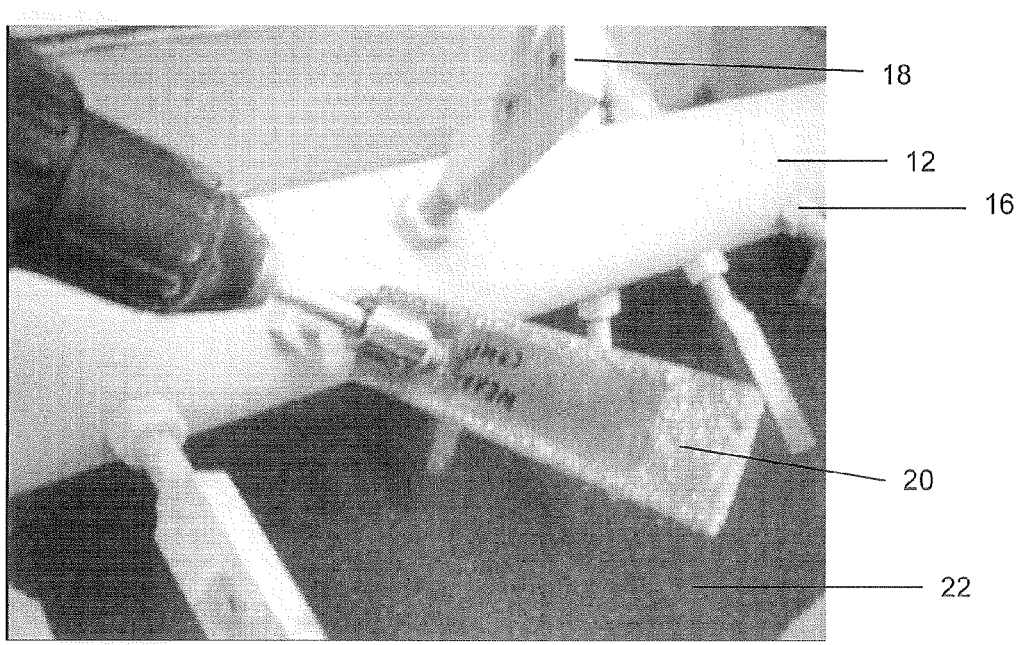
FIG. 2 is an illustration of abrasion resistance specimens being installed in the abrasion tester of FIG. 1.
Figure 3:
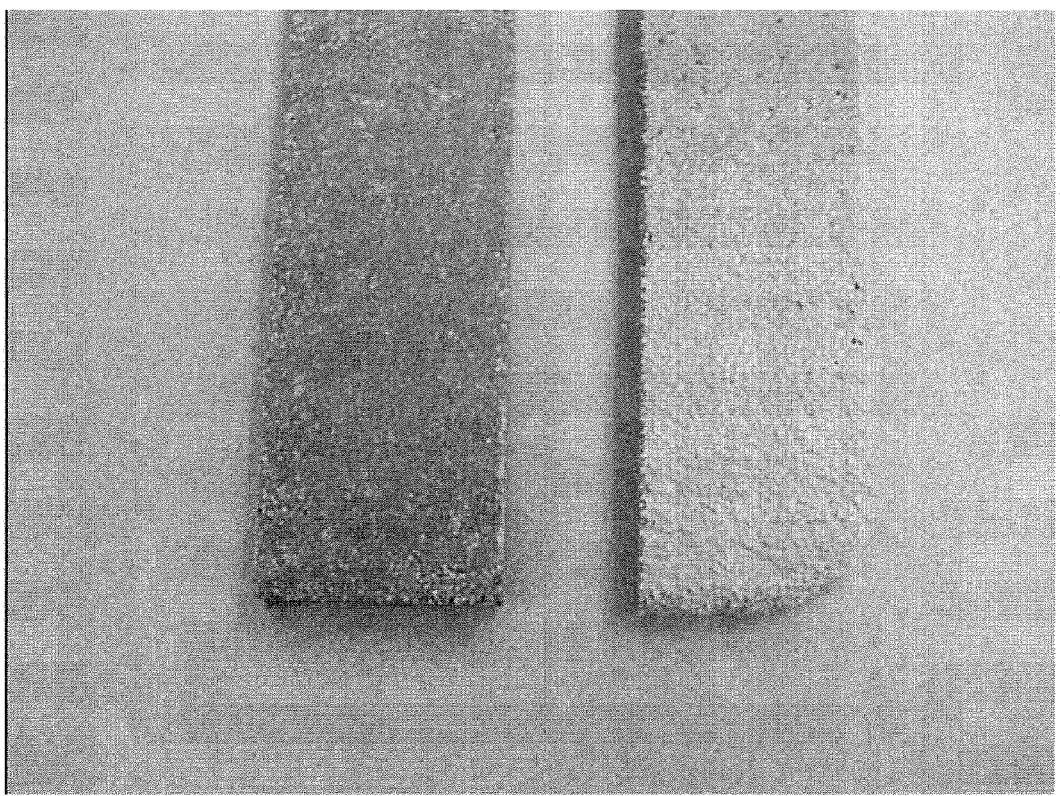
FIG. 3 is an illustration of coated abrasion resistance specimens before (left) and after (right) abrasion testing in the abrasion tester of FIG. 1.

Multiple 1 inch by 4 inch steel plates are coated with a film of each wearing compound to be tested. Each film is cured for a time and at a temperature sufficient to cure the film. The cured specimens are weighed after cooling and the weighed specimens are mounted into the specimen holders (See FIG. 2). The abrasion tester hopper is filled with 12 mesh aluminum oxide abrasive media. The tester is started and shaft rotational speed set to 70 rpm. Testing is conducted under ambient conditions (about 70° F. and 50% relative humidity) and continued for the desired test period. Periodically, coated specimens are removed, cleaned with water and dried; weighed and weight loss percentage calculated. After weighing the specimens are placed back in the abrasion tester and the testing is continued. Each week the abrasive media is replaced with new abrasive.

Four 1 inch by 4 inch steel plates were each coated with 3 mm films of the EXAMPLE 1 material; NORDBAK wearing compound; NORDBAK high temperature wearing compound and NORDBAK ultra high temperature wearing compound to prepare specimens. The NORDBAK compounds are available from Henkel Corporation, Rocky Hill, Conn. Each film was cured by heating to 75° F. for 24 hrs, than to 250° F. for about 2 hours. The cured specimens were weighed after cooling, mounted in the abrasion tester and tested using the above abrasion resistance test. Results are summarized in the following Table.

TABLE 1

| | | initial | 168 hours | | 366 hours | | 504 hours | | 672 hours | |
|---|---|---|---|---|---|---|---|---|---|---|
| | | wt (gms) | wt (gms) | % loss | wt (gms) | % loss | wt (gms) | % loss | wt (gms) | cumulative % loss |
| A[1] | average | 102.6 | 101.4 | 1 | 100.8 | 2 | 100.5 | 2 | 100.0 | 2.5 |
| | SD | 2.3 | 2.2 | 0 | 2.1 | 0 | 2.0 | 0 | 2.0 | .3 |
| B[2] | average | 103.0 | 101.8 | 1 | 101.0 | 2 | 100.8 | 2 | 100.4 | 2.5 |
| | SD | 1.1 | 1.2 | 0 | 1.3 | 0 | 1.2 | 0 | 1.2 | .3 |
| C[3] | average | 99.5 | 98.1 | 1 | 97.8 | 2 | 97.4 | 2 | 97.0 | 2.5 |
| | SD | 1.5 | 1.9 | 0 | 1.3 | 0 | 1.3 | 0 | 1.2 | .3 |
| 1[4] | average | 103.0 | 101.6 | 1 | 101.0 | 2 | 100.5 | 2 | 99.9 | 3 |
| | SD | 4.4 | 4.3 | 0 | 4.4 | 0 | 4.3 | 0 | 4.4 | 0 |

[1]NORDBAK wearing compound
[2]NORDBAK high temperature wearing compound
[3]NORDBAK ultra high temperature wearing compound
[4]EXAMPLE 1 material The disclosed wearing compound using an inorganic binder provides similar abrasion resistance properties to some very good epoxy binder wearing compounds. However, the disclosed inorganic binder wearing compounds have superior substrate adherence, cured product integrity and stability after exposure to extremely high temperatures compared to epoxy binder wearing compounds.

While preferred embodiments have been set forth for purposes of illustration, the foregoing description should not be deemed a limitation of the disclosure herein. Accordingly, various modifications, adaptations and alternatives may occur to one skilled in the art without departing from the spirit and scope of the present disclosure.

What is claimed:

1. A fluid wearing compound, comprising a substantially homogeneous mixture of:
    about 10 to about 50 weight percent of an inorganic binder;
    about 0.5 to about 5 weight percent glycerin;
    about 10 to about 40 weight percent powdered $Al_2O_3$;
    about 30 to about 70 weight percent sintered $Al_2O_3$ particles;
    water; and
    optionally, about 0.2 to about 5 weight percent discontinuous fiber reinforcement, each based on total composition.

2. The wearing compound of claim 1, wherein the inorganic binder is an alkaline metal silicate.

3. The wearing compound of claim 1, wherein the inorganic binder is $Na_2SiO_3$.

4. The wearing compound of claim 1, wherein the sintered $Al_2O_3$ particles have a length of about 0.1 mm to about 10 mm.

5. The wearing compound of claim 1, wherein the sintered $Al_2O_3$ particles comprise about 10 to about 50 weight percent of particles having a length of about 0.1 mm to about 6 mm and about 10 to about 50 weight percent of particles having a length of about 5 mm to about 10 mm, each based on the total composition.

6. The wearing compound of claim 1, further comprising about 0.1 to about 10 weight percent filler.

7. The fluid wearing compound of claim 1, wherein the fluid wearing compound comprises discontinuous aramid fibers having a length of about 0.5 mm to about 5 mm.

8. A wear resistant layer comprising the substantially dried product of the fluid wearing compound of claim 1 overlying a wearable substrate.

9. The wear resistant layer of claim 8, wherein the layer will substantially retain its form on the substrate after exposure to 1,000° F. for 60 minutes in an air atmosphere.

10. A method of protecting a substrate from wear, comprising: applying a layer of the fluid wearing compound of claim 1 over the substrate; and exposing the layer to a temperature for a time period sufficient to substantially remove the water from the fluid wearing compound.

11. The method of claim 10 wherein the substrate is the interior surface of a pipe fitting.

12. The method of claim 10 wherein the layer is exposed to a temperature of at least 200° F. for a time of at least 120 minutes.

* * * * *